(12) United States Patent
Ichimasa

(10) Patent No.: US 8,944,611 B2
(45) Date of Patent: Feb. 3, 2015

(54) PROJECTOR, PROJECTOR CONTROL METHOD, AND PROJECTION SYSTEM

(75) Inventor: Shoji Ichimasa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 588 days.

(21) Appl. No.: 12/956,023

(22) Filed: Nov. 30, 2010

(65) Prior Publication Data

US 2011/0141380 A1 Jun. 16, 2011

(30) Foreign Application Priority Data

Dec. 15, 2009 (JP) ................................. 2009-283561

(51) Int. Cl.
*G03B 21/26* (2006.01)
*G09G 3/36* (2006.01)
*G09G 3/00* (2006.01)
*H04N 7/01* (2006.01)
*H04N 9/31* (2006.01)

(52) U.S. Cl.
CPC .............. *G09G 3/3611* (2013.01); *G09G 3/001* (2013.01); *H04N 7/0132* (2013.01); *H04N 9/3147* (2013.01); *H04N 9/3197* (2013.01); *G09G 3/3614* (2013.01); *G09G 2300/023* (2013.01); *G09G 2320/0247* (2013.01); *G09G 2340/0435* (2013.01)
USPC ............................................. 353/94; 353/30

(58) Field of Classification Search
CPC ........ G02F 1/133; G03B 21/14; G03B 21/00; F21V 9/00; H04N 5/455; H04N 5/74
USPC ............... 353/94; 345/1.3; 349/7–9; 348/362
See application file for complete search history.

(56) References Cited

U.S. PATENT DOCUMENTS

| 5,264,953 | A | * | 11/1993 | Hirai et al. | 349/33 |
|---|---|---|---|---|---|
| 5,481,320 | A | * | 1/1996 | Konuma et al. | 348/751 |
| 6,879,311 | B2 | * | 4/2005 | Sono | 345/94 |
| 7,893,908 | B2 | | 2/2011 | Morimoto et al. | |
| 8,061,853 | B2 | * | 11/2011 | Miyazawa et al. | 353/79 |
| 2007/0262940 | A1 | | 11/2007 | Morimoto et al. | |
| 2007/0296657 | A1 | | 12/2007 | Ooga et al. | |
| 2008/0036971 | A1 | * | 2/2008 | Hasegawa | 353/30 |
| 2009/0073192 | A1 | | 3/2009 | Kobayashi | |
| 2009/0073393 | A1 | * | 3/2009 | Lee et al. | 353/94 |

FOREIGN PATENT DOCUMENTS

| CN | 101000752 A | 7/2007 |
|---|---|---|
| CN | 101071213 A | 11/2007 |
| CN | 101365052 A | 2/2009 |

(Continued)

OTHER PUBLICATIONS

Translation of Japanese publication 2005-097582.*

(Continued)

*Primary Examiner* — Francis M Legasse, Jr.
*Assistant Examiner* — Jerry Brooks
(74) *Attorney, Agent, or Firm* — Fitzpatrick, Cella, Harper & Scinto

(57) ABSTRACT

When images are projected in a superposing manner on a screen by a plurality of projectors, a controller of a projector obtains drive timing information of liquid crystal panels of the plurality of projectors and controls a drive timing of a drive unit on the basis of the obtained drive timing information so as to reduce a flicker of a display image.

9 Claims, 17 Drawing Sheets

(56) References Cited

FOREIGN PATENT DOCUMENTS

| | | | |
|---|---|---|---|
| JP | 05-292518 A | 11/1993 | |
| JP | 7-284128 A | 10/1995 | |
| JP | 2005-159641 A | 6/2005 | |
| JP | 2006-113326 A | 4/2006 | |
| JP | 2005-097582 | * | 10/2006 |
| JP | 2006-276629 A | 10/2006 | |

OTHER PUBLICATIONS

Chinese Office Action dated Oct. 15, 2012, in related Chinese Application No. 201010610812.X (with English translation).

* cited by examiner

PROJECTOR, PROJECTOR CONTROL METHOD, AND PROJECTION SYSTEM

BACKGROUND OF THE INVENTION

1. Field of the Invention

The present invention relates to a projector, a projector control method, and a projection system, and more specifically, to a projection apparatus, a projection method, and a projection system for compositely displaying projection images projected respectively from a plurality of projection apparatuses.

2. Description of the Related Art

Conventionally, in a projection apparatus that projects a display image to be displayed on a liquid crystal panel, on a screen, a drive voltage of the liquid crystal panel is inverted on a frame basis in order to increase endurance or contrast of liquid crystals. In other words, a positive frame that is positively driven to a predetermined voltage and a negative frame that is negatively driven to a predetermined voltage are alternately arranged on the frame basis to drive the liquid crystal panel by a so-called alternating current drive. However, there are cases where brightness fluctuates in each drive of a positive frame/negative frame due to a deviation in common voltage or the like, resulting in a so-called flicker in which a projection screen flickers. For example, Japanese Patent Application Laid-Open No. H05-292518 describes reducing a flicker by inverting drives of positive and negative frames on the unit basis of each color of a liquid crystal panel (where R and B have the same phase, and G is in inverse phase with respect to R and B) in a single projector.

In addition, conventionally, projection images of a plurality of projection apparatuses are projected in a superposing manner on a same screen (stack projection), or a plurality of projection apparatuses project respective images to be displayed on a part of a single screen (multi projection). Stack projection enables a brighter image to be displayed, while multi projection enables a high definition image to be displayed in a larger screen.

During such stack projection, when each of a plurality of projectors performs alternating current drive in the conventional manner, a coincidental synchronization caused by flickers of the respective projection apparatuses sometimes results in an increase in a flicker of the display image.

It is an aspect of the invention to provide a projection apparatus, a projection method, and a projection system that solves such problems.

Specifically, the present invention provides a projection apparatus, a projection method, and a projection system capable of obtaining a projection image with a low flicker in stack projection, which superposes projection images of a plurality of projectors to form a projection image, by cancelling out flickers included in the respective images.

SUMMARY OF THE INVENTION

According to an aspect of the present invention, a projection system comprises a plurality of projectors that projects an image on a screen, wherein each of the plurality of projectors comprises: a drive unit adapted to drive a liquid crystal panel for displaying an image to be projected in a frame inversion manner between a positive frame and a negative frame; a controller adapted to control a drive timing of the drive unit; and a communication unit adapted to communicate with other projectors, wherein the controller of one of the plurality of projectors obtains drive timing information of the liquid crystal panels of the plurality of projectors and controls the drive timing of the drive unit on the basis of the obtained drive timing information so as to reduce a flicker of a display image.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings.

First Embodiment

Figure 1:
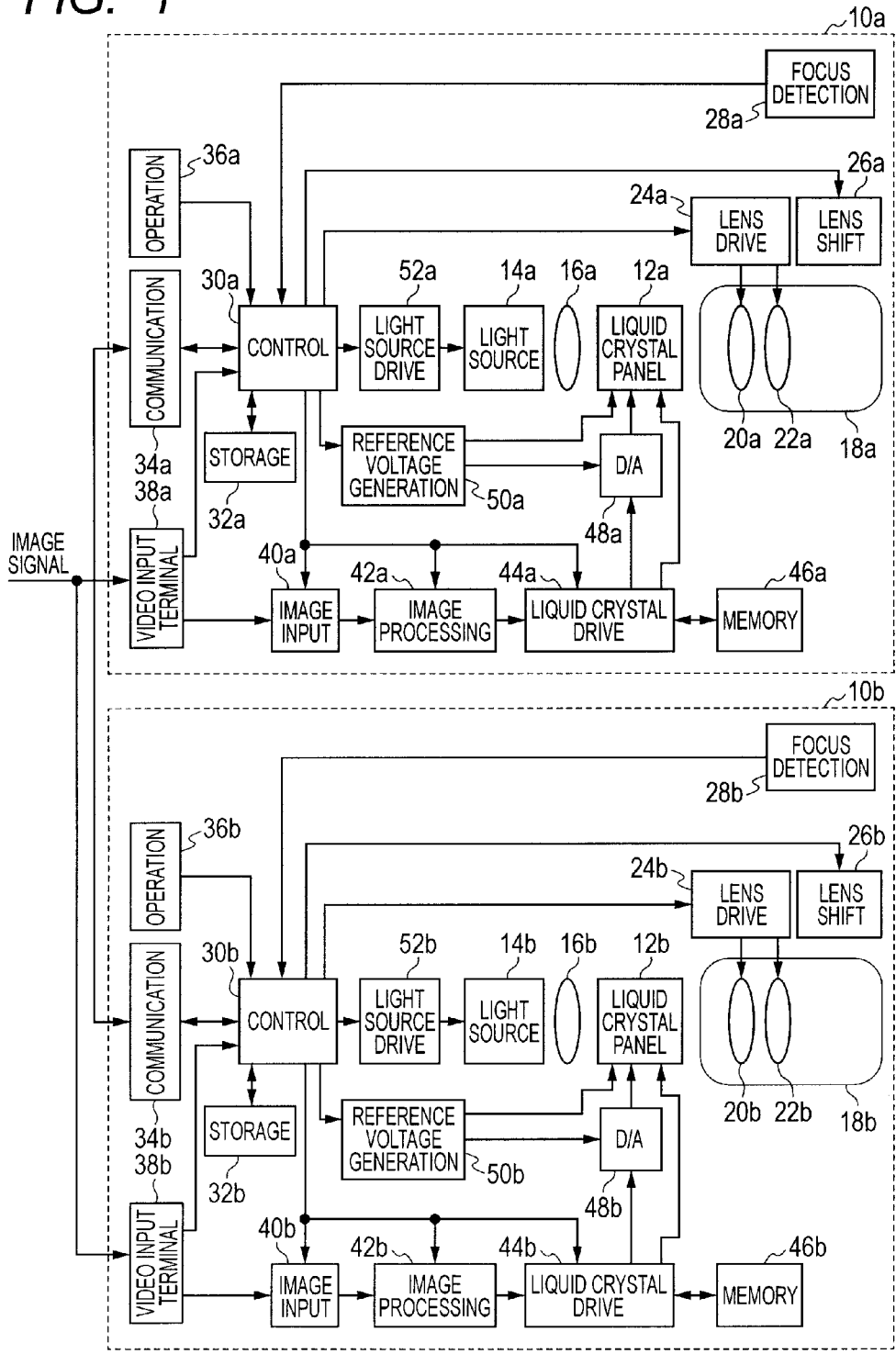
FIG. 1 is a schematic configuration block diagram of a projection system according to an exemplary embodiment of the present invention.

FIG. 1 is a schematic configuration block diagram of an embodiment of a projection system according to the present invention. Here, while a projection system including two projectors 10a and 10b is illustrated to facilitate understanding, it is obvious that a projection system combining three or more projectors may similarly be used.

The projectors 10a and 10b are configured the same, so that respective corresponding components of the projectors 10a and 10b will be distinguished from each other by attaching one of the letters "a" and "b" to reference numerals. With the exception of cases where distinguishing is necessary, the letters "a" and "b" will be omitted in the explanation of a general configuration and functions of the projectors 10a and 10b. A liquid crystal panel 12 represents a liquid crystal panel 12a of the projector 10a as well as a liquid crystal panel 12b of the projector 10b.

The liquid crystal panel 12 is driven as will be described later to display an image. A light source 14 is arranged on a rear surface of the liquid crystal panel 12 and illuminates the liquid crystal panel 12 via an optical system 16. In a manner of speaking, the liquid crystal panel 12 spatially modulates intensity of illumination light emitted from the light source 14 to generate a spatially-modulated light representing an image to be projected on a screen. A projection optical system 18 projects a spatially-modulated light output from the liquid crystal panel 12 toward the screen. The projection optical system 18 includes an autofocus lens 20 and a zoom lens 22, and enables an in-focus distance and an angle of view to be adjusted. A lens drive unit 24 moves the autofocus lens 20 and the zoom lens 22 independently of each other in an optical axis direction. A lens shift device 26 moves the projection optical system 18 among each of two axes perpendicular to the optical axis. Consequently, a projection position on the screen can be adjusted.

A focus detection unit 28 detects an in-focus degree of an image projected on the screen, not illustrated, by the projection optical system 18. Specifically, the focus detection unit 28 includes an eyeglass lens and a pair of line sensors that receives light incident from the eyeglass lens, and performs computation based on contrast positions of the respective line sensors. The focus detection unit 28 supplies a focus detection signal indicating a distance to the screen, obtained through such computation, to a control unit 30. The control unit 30 controls a position of the autofocus lens 20 on the optical axis by the lens drive unit 24 on the basis of the focus detection signal from the focus detection unit 28, so that a projected optical image is formed on the screen.

The control unit 30 totally controls the projector 10 and is responsible for various computations and control. The control unit 30 stores various data in a storage unit 32, and is capable of communicating with other projectors via a communication unit 34. In the configuration illustrated in FIG. 1, a control unit 30a communicates with a control unit 30b of a projector 10b via a communication unit 34a and via a communication unit 34b of the projector 10b. A user can input various instructions to the control unit 30 using an operating unit 36. The operating unit 36 includes, for example, a power switch, a mode switch, a zoom switch, and a select/enter key for selecting and entering various options.

An image signal from an external video source is input to an image input unit 40 via a video input terminal 38. An image signal from an external video source is one of an analog signal of a component or the like and a digital signal of DVI, HDMI, wireless broadcast or the like. The control unit 30 controls the image input unit 40 in accordance with information and the like set using the operating unit 36. Based on a control signal from the control unit 30, the image input unit 40 processes an image signal from the video input terminal 38 for display. The image input unit 40 converts an analog input image signal into a digital signal, and expands an input image signal in case of compressed image data. An image processing unit 42 performs known noise removal, contour emphasis, image scaling, trapezoidal correction, or the like on each frame image from the image input unit 40, and outputs the processed frame images to a liquid crystal drive unit 44.

The liquid crystal drive unit 44 uses a memory 46 such as an SDRAM to add a double speed drive timing sync signal to image data from the image processing unit 42, and applies thereto processing such as gamma conversion. The liquid crystal drive unit 44 supplies an image data signal for driving the liquid crystal panel 12 generated in this manner, to a D/A converter 48, and a double speed drive timing sync signal generated in this manner to the liquid crystal panel 12.

Under the control of the control unit 30, a reference voltage generating unit 50 generates a voltage Vcom of a transparent electrode that opposes a pixel electrode of the liquid crystal panel 12, and a drive voltage setting voltage of the D/A converter 48. According to the drive voltage setting voltage from the reference voltage generating unit 50, the D/A converter 48 converts an image data signal from the liquid crystal drive unit 44 into an analog signal, and applies the analog signal as a liquid crystal drive signal to the liquid crystal panel 12. The liquid crystal drive signal generated at this point has a frame inversion configuration in which a positive frame and a negative frame are alternately arranged on the frame basis. In other words, the liquid crystal drive unit 44 and the D/A converter 48 function as a drive unit that drives the liquid crystal panel 12 in a frame inversion manner between positive/negative frames.

The liquid crystal panel 12 displays an image at double-speed in accordance with a double speed drive timing sync signal from the liquid crystal drive unit 44 and a converted liquid crystal drive signal from the D/A converter 48. Moreover, while the liquid crystal panel 12 is normally made up of three panels for red (R), green (G), and blue (B), a description thereof will be omitted since differences among the three panels are irrelevant to the present invention. The control unit 30 controls turning on/off and brightness of the light source 14 using a light source drive unit 52. The optical system 16 is arranged to inter illumination light generated by the light source 14 into the liquid crystal panel 12 as parallel light. The liquid crystal panel 12 spatially modulates intensity of the incident illumination light and converts the spatially-modulated illumination light into a light signal for carrying an image to be displayed. The projection optical system 18 projects the intensity-modulated light from the liquid crystal panel 12 to a screen, not illustrated as described earlier.

Figure 2:
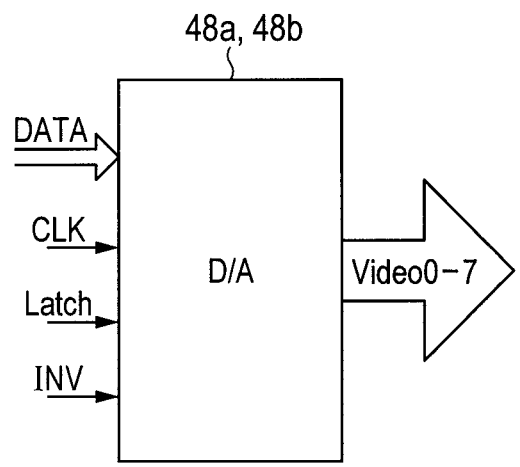
FIG. 2 is a diagram illustrating input/output signals of a D/A converter that generates a liquid crystal drive signal according to a first embodiment of the present invention.

FIG. 2 illustrates input/output signals of the D/A converter 48. A clock CLK, input data DATA, a latch signal Latch, and a control signal INV indicating whether or not inversion has been performed are input to the D/A converter 48 from the liquid crystal drive unit 44. The D/A converter 48 includes eight channel analog drive signal outputs Video0 to Video7. In other words, the D/A converter 48 is equipped with a function for parallelizing analog signals of eight channels.

Figure 3:
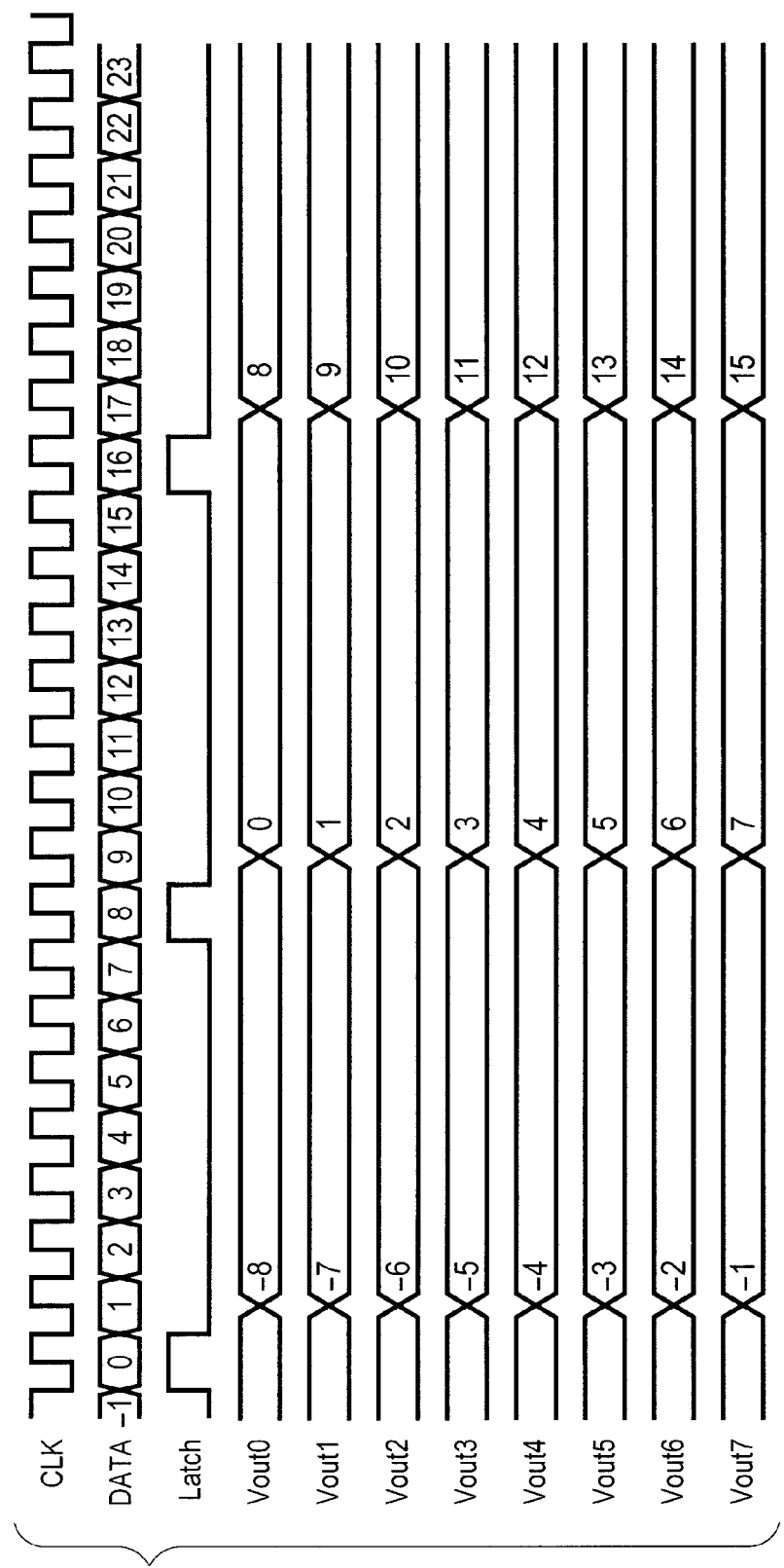
FIG. 3 is a timing chart of a D/A converter that generates a liquid crystal drive signal according to the first embodiment of the present invention.

FIG. 3 illustrates timings of the clock CLK, the input data DATA, the latch signal Latch, and output signals Video0 to Video7. As illustrated in FIG. 3, the D/A converter 48 stores an output amount of input data DATA to an internal register at a leading edge of the clock CLK. The INV signal indicates whether or not outputs Video0 to Video7 that are analog voltages are to be subjected to voltage inversion to one of a positive voltage and a negative voltage in accordance with the input data DATA with respect to a predetermined central voltage. In this case, since there are eight channels of analog output, after input data DATA corresponding to eight clock cycles is stored to the internal register, each of data is latched at a leading edge of the latch signal Latch. Subsequently, an analog signal of data DATA up to a leading edge of the latch signal Latch is output from a corresponding channel in response to correspond to a leading edge of the clock CLK after a trailing edge of the latch signal Latch. A liquid crystal drive signal of the liquid crystal panel 12 is generated by repeating this procedure.

Figure 4:
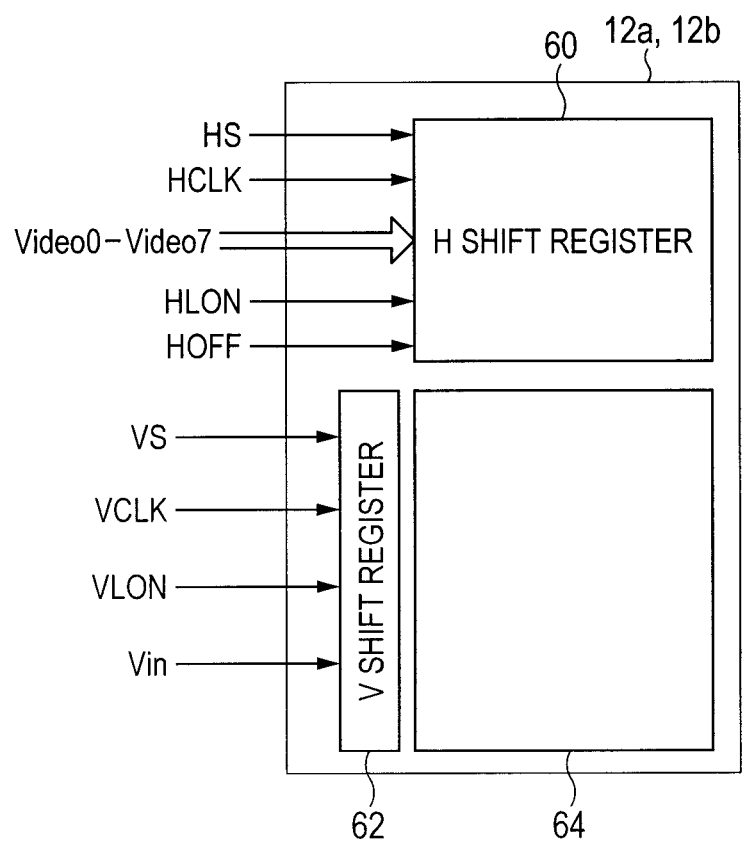
FIG. 4 is a schematic configuration diagram of a liquid crystal panel according to the first embodiment of the present invention.
Figure 5:
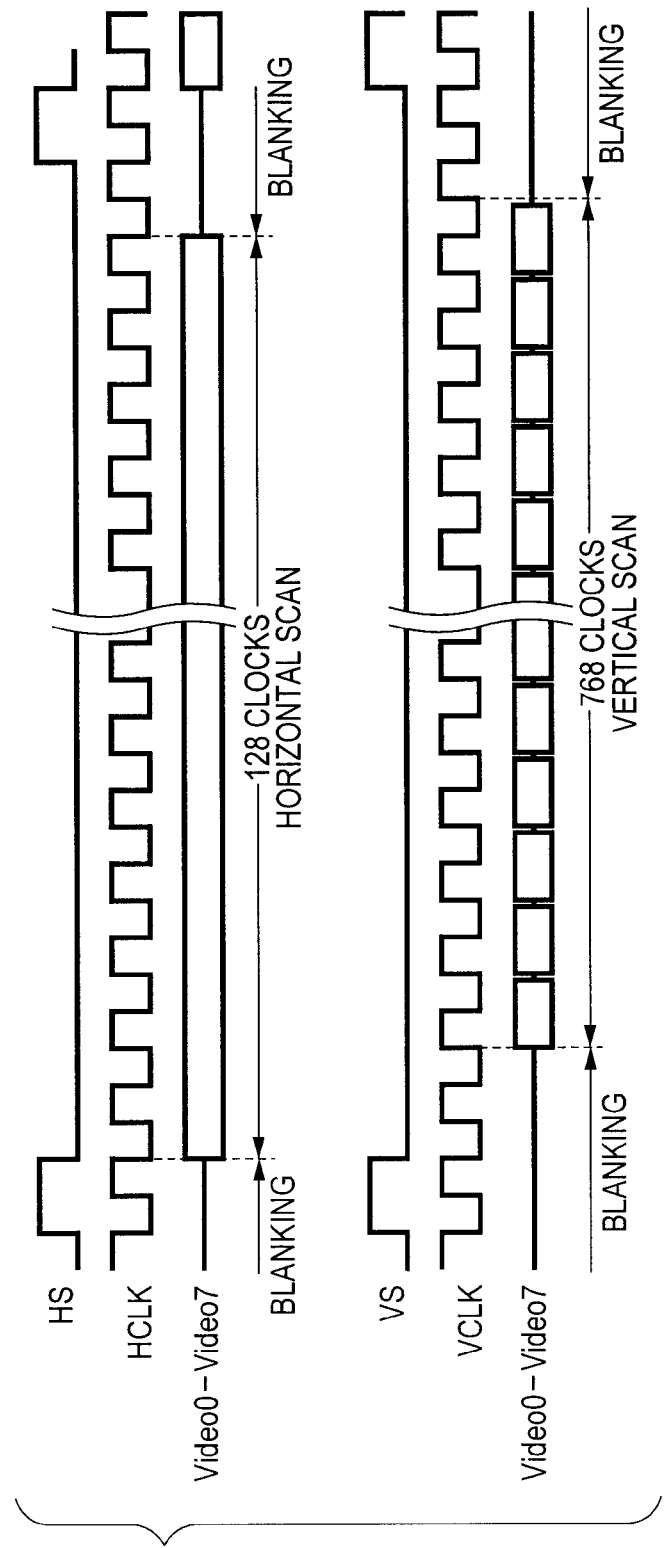
FIG. 5 is a drive timing chart of a liquid crystal panel according to the first embodiment of the present invention.

FIG. 4 illustrates an internal configuration of the liquid crystal panel 12. The liquid crystal panel 12 includes an H (horizontal) shift register 60, a V (vertical) shift register 62, and a pixel area 64 for displaying an image. FIG. 5 is a timing chart illustrating horizontal scanning and vertical scanning of the liquid crystal panel 12. Horizontal scanning is performed as follows. Specifically, the H shift register 60 is reset and started by an HS signal (horizontal sync signal), and updates liquid crystal drive signals Video0 to Video7 on the clock cycle basis of a horizontal sync clock (HCLK). At this point, the V shift register 62 turns on eight vertically-aligned signal lines that are a display object. The horizontal sync clock HCLK has the same frequency as the latch signal Latch illustrated in FIG. 3. For example, when a resolution of the liquid crystal panel 12 is set to XGA or 1024 pixels×768 lines, the pixel area 64 of the liquid crystal panel 12 is scanned in the horizontal direction on 128 clock cycles of the horizontal sync clock HCLK. A next HS signal resets and starts the H shift register 60 to execute a next horizontal scan. Practically, horizontal scanning is performed on the number of clock cycles obtained by adding several clock cycles of so-called blanking to the number of horizontal sync clock cycles (for example, 128 clock cycles) necessary for a scan in the horizontal direction.

As for vertical scanning, a VS signal (vertical shift signal) resets and starts the V shift register 62. The V shift register 62 is shifted by one line for each clock cycle of a vertical sync clock (VCLK signal). When the resolution of the liquid crystal panel 12 is set to XGA or 1024 (pixels)×768 (lines), a scan of the liquid crystal panel 12 in the vertical direction is completed with 768 clock cycles of the vertical sync clock (VCLK). Practically, in the same manner as in horizontal scanning, vertical scanning is also performed in the number of clock cycles obtained by adding several clock cycles of blanking to the 768 clock cycles required by the vertical sync clock (VCLK). The number of clock cycles for blanking is arbitrary.

Due to such horizontal scanning and vertical scanning, each pixel of the pixel area 64 of the liquid crystal panel 12 is driven by the liquid crystal drive signals Video0 to Video7 and attains a brightness corresponding to the intensity of the liquid crystal drive signals Video0 to Video7.

In addition, a black area of eight pixels is respectively provided above, below, and to the left and right of display pixels of 1024 (pixels)×768 (lines). The black areas are driven according to a blanking clock by a liquid crystal drive signal obtained by adding a voltage Vcom to a pixel signal. However, when a positional displacement of a pixel occurs, the eight pixels of the upper, lower, left and right black areas are used to perform position alignment by changing a write position of an image signal in the pixel area 64.

Figure 6:
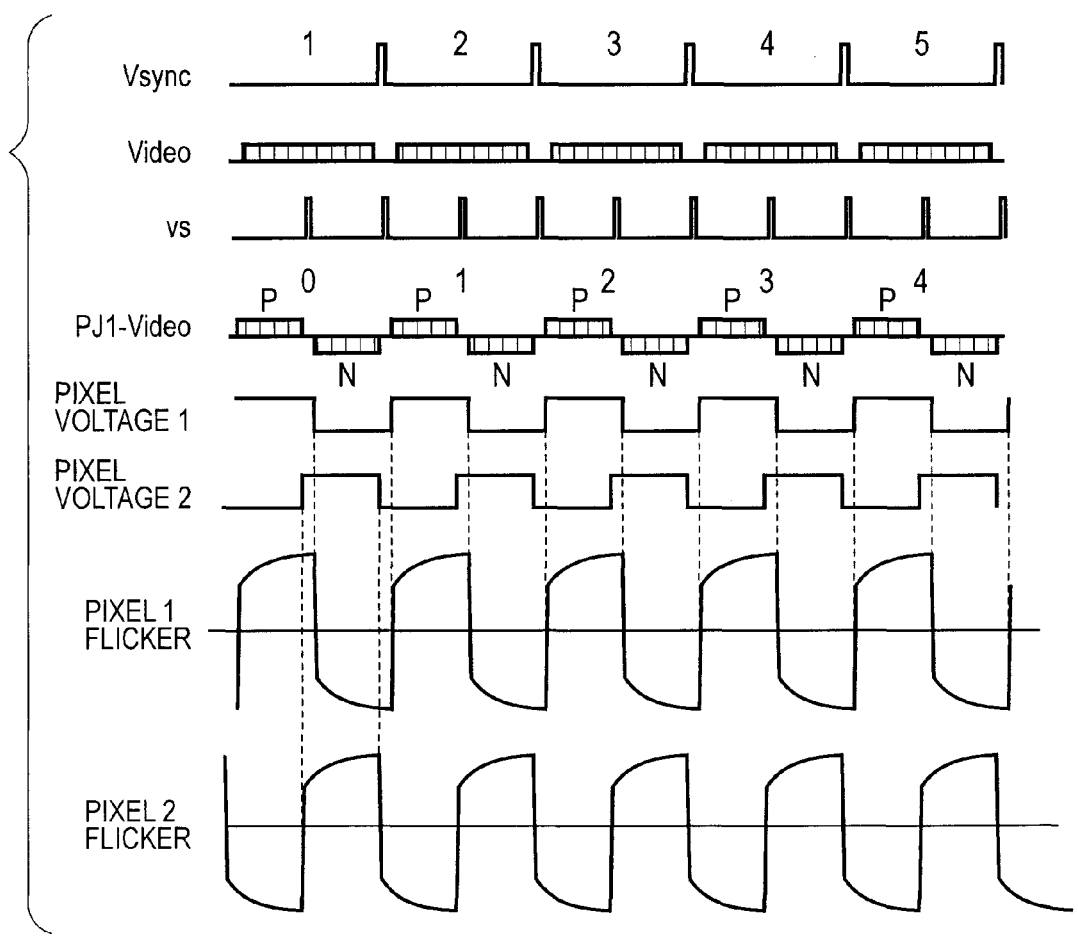
FIG. 6 is a timing chart of liquid crystal drive and flicker according to the first embodiment of the present invention.

A drive operation of the liquid crystal panel 12 due to an input image signal will be described with reference to FIG. 6. In FIG. 6, Vsync denotes a vertical sync signal of an input image signal input from the input terminal 38 and Video denotes image data of the input image signal. VS denotes a vertical sync signal that drives the liquid crystal panel 12 to display the input image signal at double speed. When a distinction must be made between a Vsync signal and a VS signal, the former will be referred to as an image vertical sync signal and the latter a drive vertical sync signal.

A VS signal illustrated in FIG. 6 is same as the VS signal illustrated in FIG. 5 and resets and starts the V shift register 62. The liquid crystal drive unit 44 generates a VS signal in order to perform double speed drive of the liquid crystal panel 12 onto an image signal from the input terminal 38. In other words, in FIG. 6, the VS signal is a timing signal having a frequency that is twice the frequency of the Vsync signal.

PJ-Video signal is a liquid crystal drive signal Video obtained by converting image data for double speed drive, output from the liquid crystal drive unit 44, into an analog signal using the D/A converter 48.

Pixel voltage refers to a voltage written into a pixel capacity at the liquid crystal panel 12. Pixel voltage 1 denotes a voltage of a first pixel during scanning of the liquid crystal panel, and pixel voltage 2 denotes a voltage of a last pixel during scanning of the liquid crystal panel.

A flicker occurs when a voltage Vcom of a transparent electrode opposing a pixel capacity of the liquid crystal panel 12 does not have an appropriate voltage value. For example, the transparent electrode voltage Vcom has a value of approximately 7 V when the voltage of the PJ-Video signal is 7 V±5 V. However, the value may deviate from 7 V due to a circuit factor, a liquid crystal factor, a manufacturing method, and the like of the liquid crystal panel 12. In addition, an appropriate transparent electrode voltage Vcom will change temporally due to receiving illumination light of the light source 14.

An initial operation upon activation according to the embodiment illustrated in FIG. 1 will now be described. When power is turned on, the projectors 10a and 10b first exchange information on a linked operation with other projectors using the communication units 34a and 34b. For example, type information and information regarding one of a drive phase and a drive timing such as a negative/positive frame inversion flag of a liquid crystal drive signal PJ-Video are exchanged. Consequently, the number of projectors which operate in the linked operation manner can be known.

The control unit 30 of each of the projectors 10a and 10b reads an initial setting value from the storage unit 32 and initializes each block component. Specifically, the image input unit 40, the image processing unit 42, the liquid crystal drive unit 44, and the reference voltage generating unit 50 are initialized. In addition, focal lengths (zoom positions) of the autofocus lens 20 and the zoom lens 22 of the projection optical system 18 are driven to a predetermined position by the lens drive unit 24, and a lens shift position of the projection optical system 18 is driven to a predetermined position by the lens shift device 26.

The control unit 30 causes a predetermined image to be displayed on the liquid crystal panel 12 and the light source 14 to be lighted. Consequently, a display image of the liquid crystal panel 12 is projected onto the screen. The focus detection unit 28 detects a distance from the projector 10 to the screen using a known phase difference method. According to the detected distance, the control unit 30 drives the autofocus lens 20 with the lens drive unit 24 so that the projected image comes into in-focus state on the screen.

Once initialization of the various parts is completed, a display operation of an input image signal is started. Specifically, the image input unit 40, the image processing unit 42, the liquid crystal drive unit 44, and the D/A converter 48 generate a liquid crystal drive signal based on an image signal input from the input terminal 38 to drive the liquid crystal panel 12. Consequently, an image of the image signal input from the input terminal 38 is projected on the screen.

Figure 7:
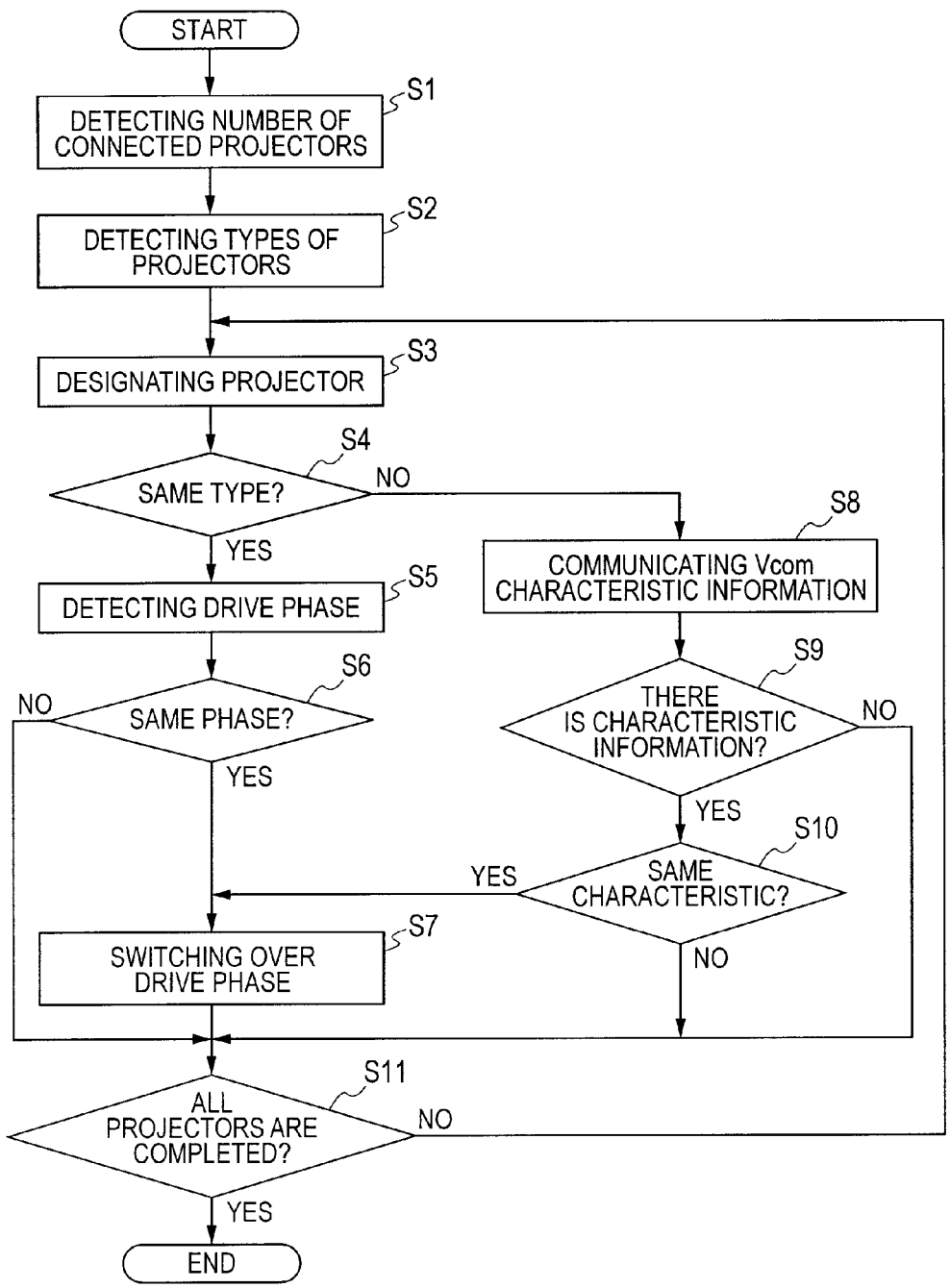
FIG. 7 is an operation flow chart of flicker control according to the first embodiment of the present invention.

A linked operation of the projectors 10a and 10b, that is a feature of the present embodiment, will now be described. FIG. 7 illustrates an operation flow chart of the linked operation. Moreover, when a plurality of projectors perform a linked operation, one of the projectors becomes a master projector and the other projectors are to operate under instructions from the master projector. In this embodiment, the projector 10a is assumed to be the master projector.

The master projector (projector 10a) communicates with other projectors, confirms the number of projectors to perform a linked operation (S1), and confirms types (S2). The number of projectors to perform the linked operation (in this embodiment, two projectors, namely, the projectors 10a and 10b) may be set in advance at the respective projectors 10a and 10b.

Identity between projector to perform the linked operation and the master projector is individually confirmed through the following process. Specifically, a projector to perform the linked operation is designated (S3). The projector designated in step S3 is referred to as a subject projector. A check then is carried out as to whether the subject projector is the same type as the master projector (S4). When the subject projector is the same type (S4), the master projector inquires the subject projector for one of a drive phase and a drive timing of a PJ-Video signal and obtains drive timing information (S5). Subsequently, a determination is made as to whether or not the obtained drive phase or drive timing of the PJ-Video signal shares the same phase with one of the drive phase and the drive timing of the master projector's own PJ-Video signal (S6). When the phases are the same (S6), brightness of display images blinks at the same timing for the master projector and the subject projector. In a case where display is performed in the superimposing manner at the same position, while blinking is to be multiplied if the phases are the same, blinking can be cancelled out if phases are inverted. Therefore, when the phases are the same (S6), the master projector instructs the subject projector to invert the drive phase of the PJ-Video signal (S7). The control unit (for example, 30b) of the subject projector (for example, 10b) controls the timing of the liquid crystal drive signal from the liquid crystal drive unit (for example, 44b) and the D/A converter (for example, 48b) so as to comply with the instruction from the master projector.

In addition, when the types are not the same (S4), the master projector inquires the subject projector for Vcom characteristic information (S8). When Vcom characteristic information is available (S9) and is the same as Vcom characteristic information of the master projector (S10), the master projector instructs the subject projector to invert a drive phase of the PJ-Video signal (S7). For example, let the Vcom characteristic of the projector 10a be such that flicker appears brightly during positive frame driving, and the Vcom characteristic of the projector 10b is such that flicker appears brightly during negative frame driving. In this case, not changing the drive phases better cancels out flickers of each other and an overall flicker level can be lowered. Therefore, in such a case, the drive phases are not changed.

The processing described above (S3 to S10) is executed for all projectors (S11). In other words, when there is an unprocessed projector (S11), the unprocessed projector is designated (S3) and steps S4 to S10 are executed thereon.

Effects of step S7 in a case where the two projectors 10a and 10b perform a linked operation will now be described in detail. It is assumed that both the master projector (projector 10a) and the projector 10b drive the liquid crystal panels 12a and 12b with a liquid crystal drive signal PJ-Video at a positive frame immediately after Vsync, as illustrated in FIG. 6. It is also assumed that the liquid crystal panels 12a and 12b share the same performances and that a transparent electrode voltage Vcom indicates a similar time variation. In this case, flickers are synthesized to be multiplied immediately after power is turned on.

Figure 8:
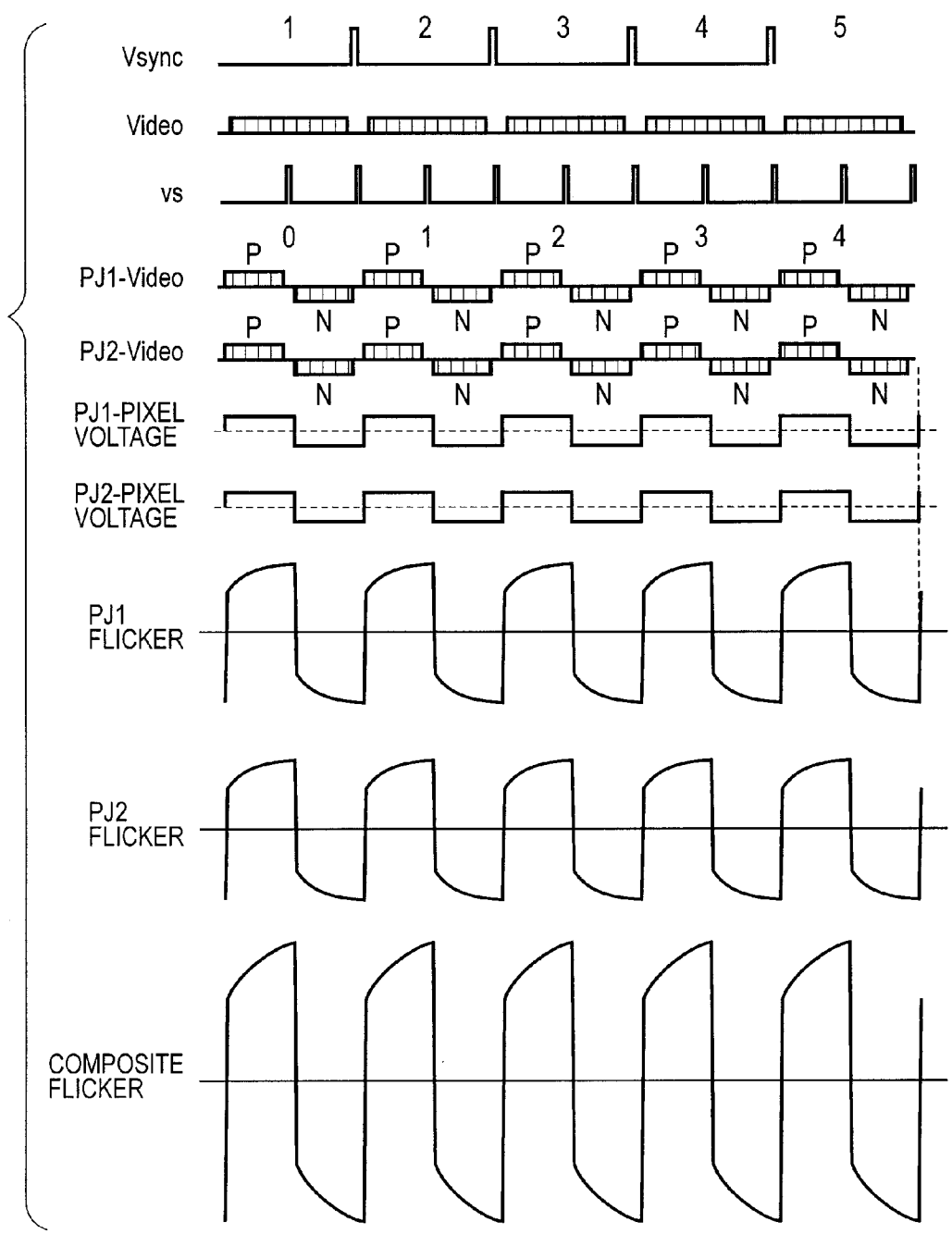
FIG. 8 is a timing chart of a case where flickers of projection images of two projectors in stack projection according to the first embodiment of the present invention have the same phase.

FIG. 8 is a timing chart illustrating a case where the projectors 10a and 10b do not perform a linked operation and the liquid crystal drive signals have the same phase. In FIG. 8, a Vsync signal, a Video signal, and a VS signal represent the same signals as illustrated in FIG. 6. A PJ1-Video signal denotes a liquid crystal drive signal applied to 10a to the liquid crystal panel 12a of the projector. A PJ2-Video signal denotes a liquid crystal drive signal applied to the liquid crystal panel 12b of the projector 10b. A PJ1-pixel voltage and a PJ2-pixel voltage respectively denote voltages of predetermined pixels (first pixels in a write timing) of the liquid crystal panels 12a and 12b of the projectors 10a and 10b. PJ1 flicker and PJ2 flicker respectively denote changes in flicker intensity occurring on projection images of the projectors 10a and 10b.

At this point, a flicker waveform of the projector 10a (PJ1 flicker) and a flicker waveform of the projector 10b (PJ2 flicker) have the same phase. In stack projection, as illustrated in FIG. 8, a composite flicker is an addition of the PJ1 flicker and the PJ2 flicker and therefore ends up being multiplied.

Figure 9:
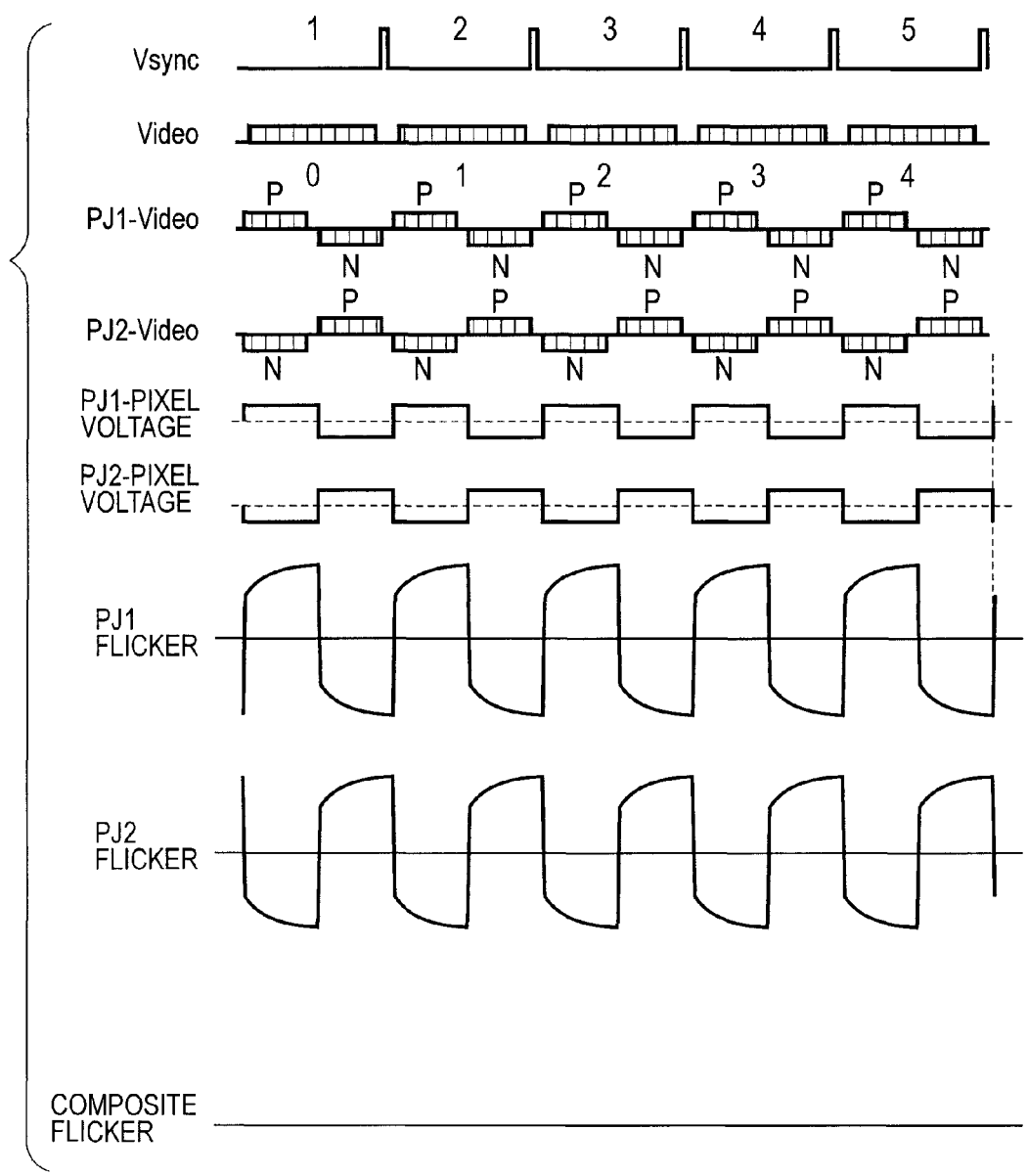
FIG. 9 is a timing chart of liquid crystal drive phase control in a case of two projectors in stack projection according to the first embodiment of the present invention.

FIG. 9 is a timing chart illustrating a case where the projectors 10a and 10b perform a linked operation. In a linked operation, the projector 10a transmits a drive phase inversion flag to the projector 10b. According to the drive phase inversion flag, the projector 10b inverts the liquid crystal drive signal PJ2-Video immediately following a Vsync signal, to a negative frame. As a result, the flicker of the projection image by the projector 10b becomes inverse in phase to the flicker of the projection image by the projector 10a, and the flickers cancel out each other due to composition. In other words, the composite flicker ideally acquires a flat waveform. In the projector 10b, the liquid crystal drive unit 44 inverts the INV signal to the D/A converter 48 in order to invert a drive voltage of the liquid crystal drive signal PJ2-Video.

Figure 10:
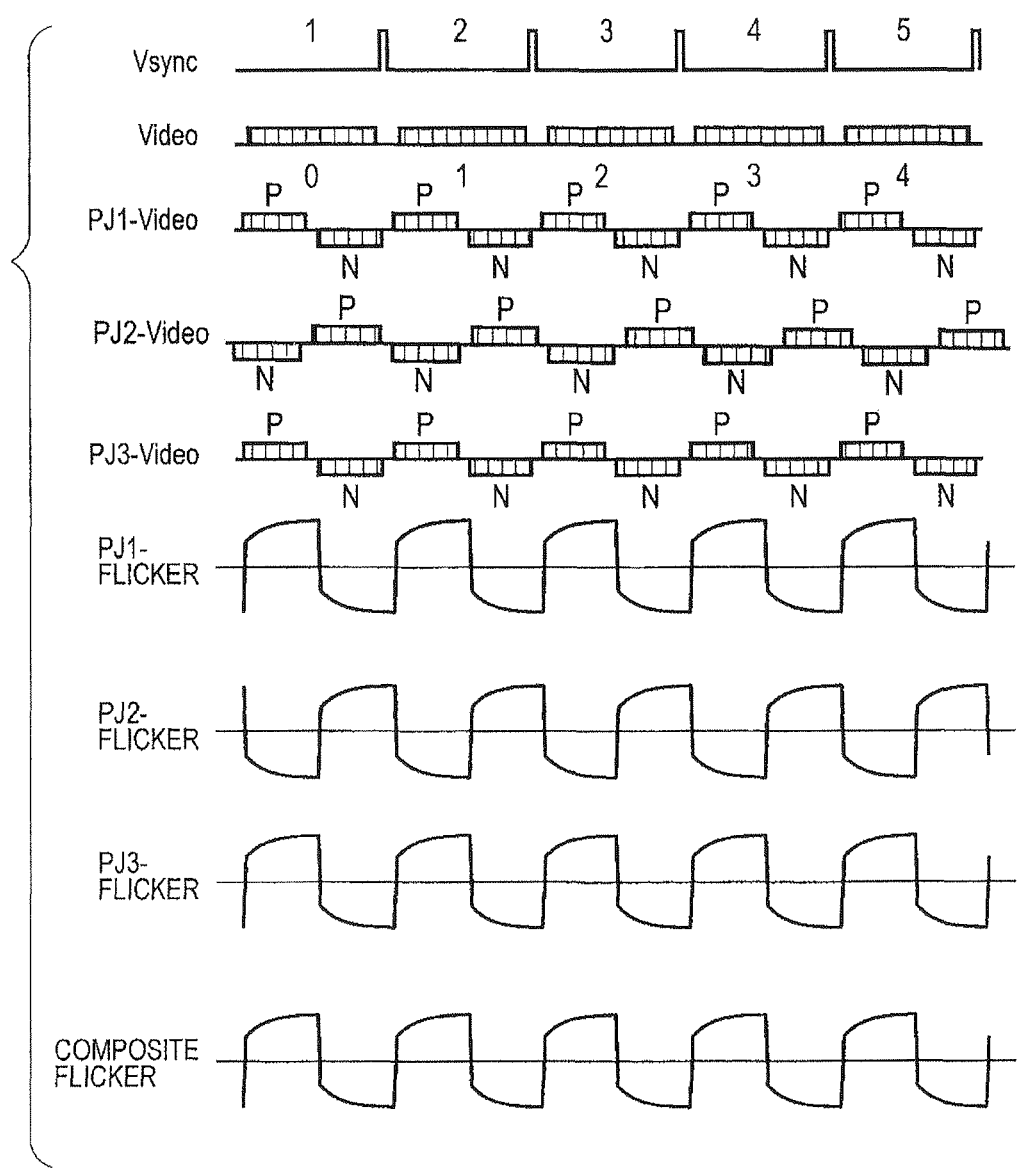
FIG. 10 is a timing chart of liquid crystal drive phase control in a case of three projectors in stack projection according to the first embodiment of the present invention.
Figure 11:
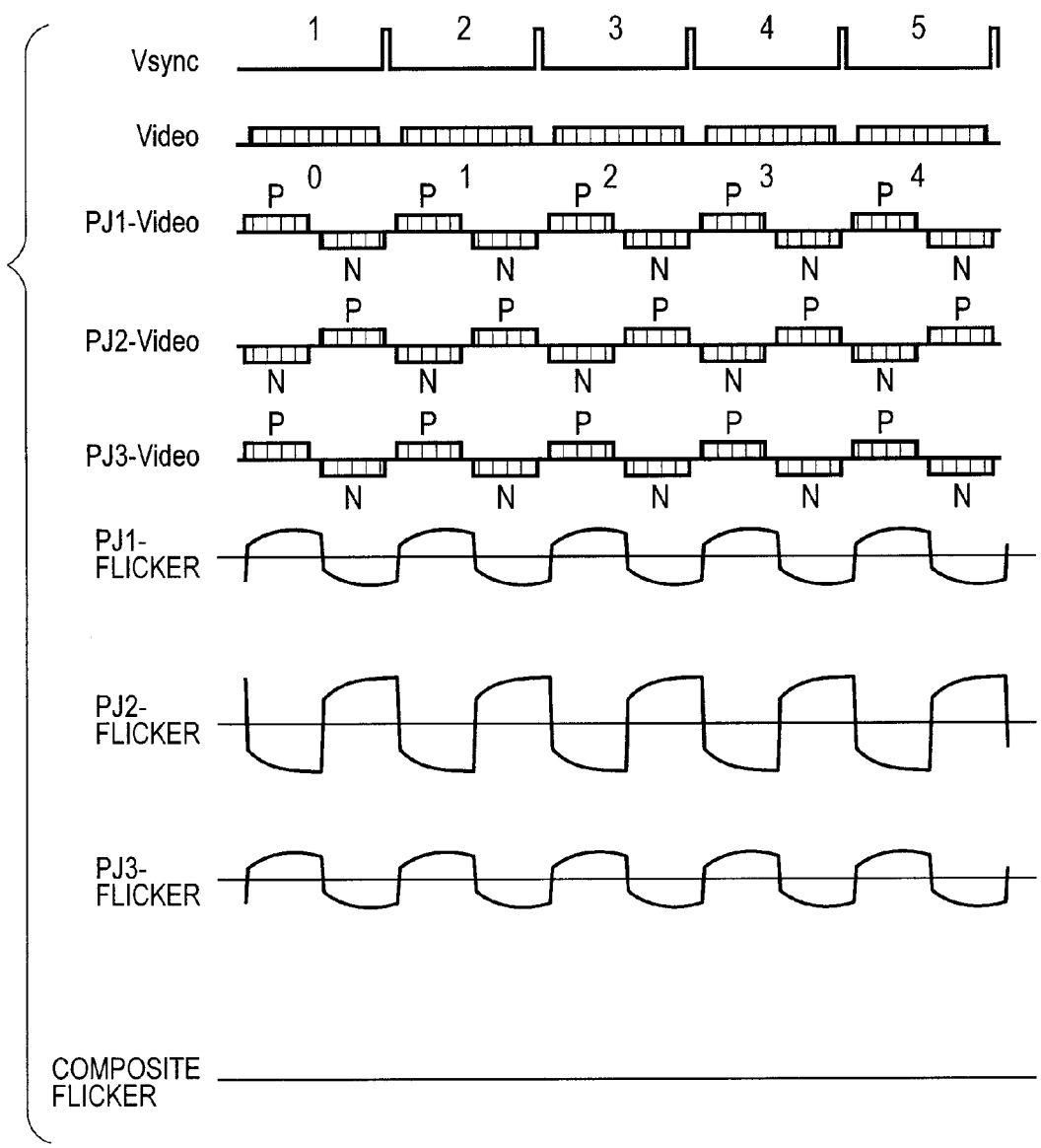
FIG. 11 is a timing chart of another liquid crystal drive phase control in a case of three projectors in stack projection according to the first embodiment of the present invention.

When three projectors perform a linked operation, as illustrated in FIG. 10, the master projector (projector 10a) sets liquid crystal drive signals of two projectors so as to have the same phase, and sets a liquid crystal drive signal of the remaining projector to an inverse phase. Consequently, a composite flicker on a composite image becomes merely a flicker caused by one projector. Furthermore, as illustrated in FIG. 11, an amplitude of a same-phase liquid crystal drive signal can be reduced in half. Consequently, the composite flicker acquires a substantially flat waveform. Such control can obviously be expanded as-is to cases where four or more projectors participate in a linked operation.

As described above, by detecting a type/Vcom characteristic of each projector to perform a linked operation and controlling phases of liquid crystal drive signals, a flicker on a composite image due to stack projection can be reduced.

Second Embodiment

Figure 12:
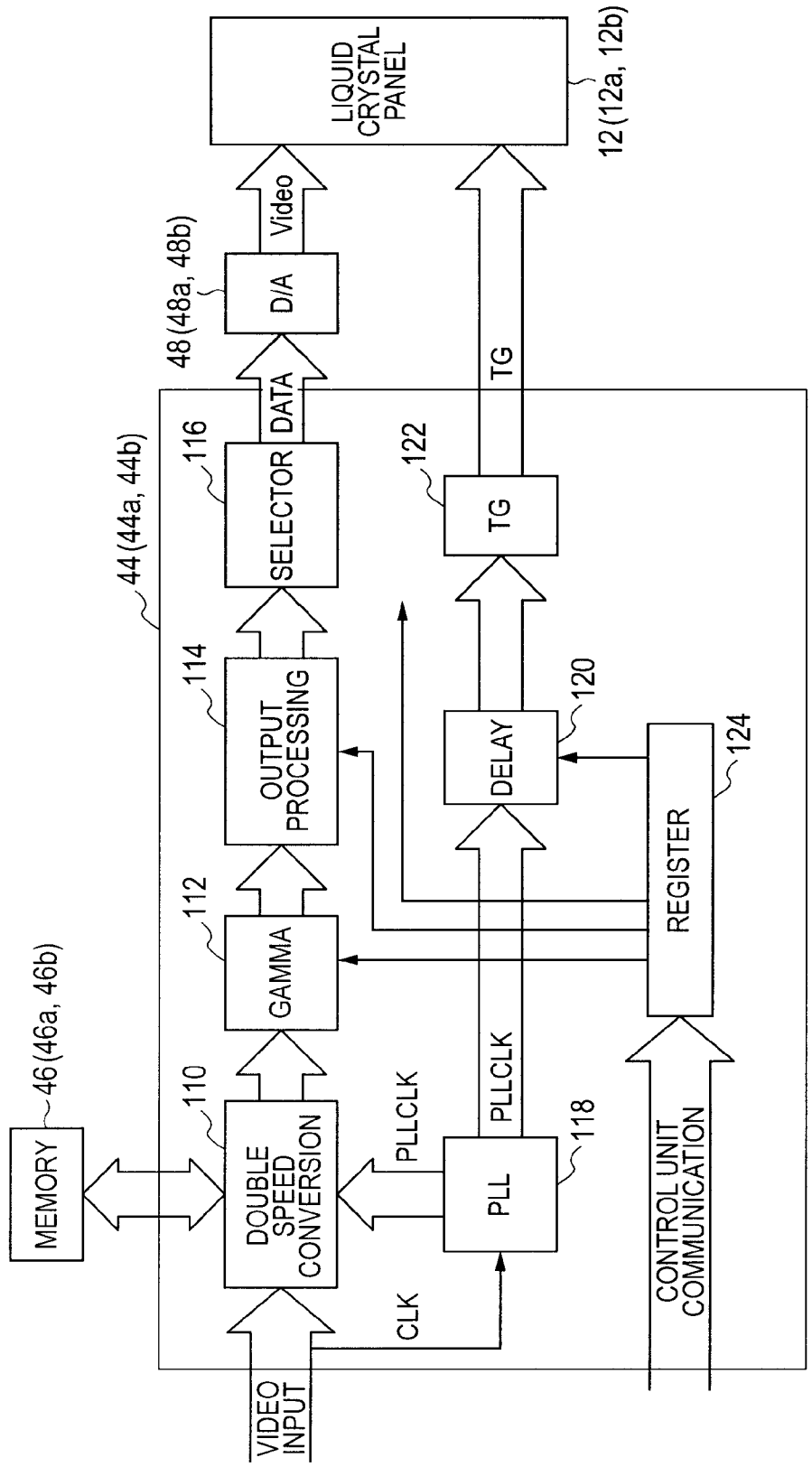
FIG. 12 is a schematic configuration block diagram of a liquid crystal drive unit having a delay circuit according to a second embodiment of the present invention.

A liquid crystal drive unit 44 (44a and 44b) can be modified so as to include a phase changing function and to output a sync signal at a double speed drive timing and image data subjected to gamma conversion and the like. FIG. 12 is a schematic configuration block diagram illustrating the liquid crystal drive unit 44 equipped with such a function.

A double speed conversion circuit 110 writes image data of one frame from an image processing unit 42 into a memory 46, and by reading twice the image data of one frame, converts 60 Hz-image data into 120 Hz-image data. A gamma circuit 112 applies gamma correction to image data from the double speed conversion circuit 110 in accordance with a gamma characteristic of a liquid crystal panel 12. An output processing circuit 114 rearranges output image data of the gamma circuit 112 in accordance with a scanning direction (left/right, up/down) of the liquid crystal panel 12. A selector circuit 116 outputs output data of the output processing circuit 114 to a D/A converter 48 as output image data of the liquid crystal drive unit 44. As described earlier, the D/A converter 48 converts image data from the liquid crystal drive unit 44 into an analog signal to generate and apply a liquid crystal drive signal (voltage signal) Video to the liquid crystal panel 12.

In addition, a PLL circuit 118 doubles a clock CLK from the image processing unit 42 and generates a clock PLLCLK for the respective circuits 110 to 116 and the liquid crystal panel 12. A delay circuit 120 delays the clock PLLCLK from the PLL circuit 118 by a delay time controlled externally, and supplies the delayed clock PLLCLK to a timing signal generating circuit (TG circuit) 122. The TG circuit 122 generates timing signals for H and V registers of the liquid crystal panel 12 from the clock from the delay circuit 120.

A register circuit 124 stores setting values and adjustment values from the control unit 30 or, more specifically, a correction value for the gamma circuit 112, a rearranging method of the output processing circuit 114, and a delay time of the delay circuit 120.

In the present embodiment, by the delay circuit 120, a phase of a projection image can be displaced by a designated amount among projectors. For example, image data and a timing signal of the image data can be delayed by ½ frame, ⅓ frame, or ⅔ frame with respect to one frame.

Figure 13:
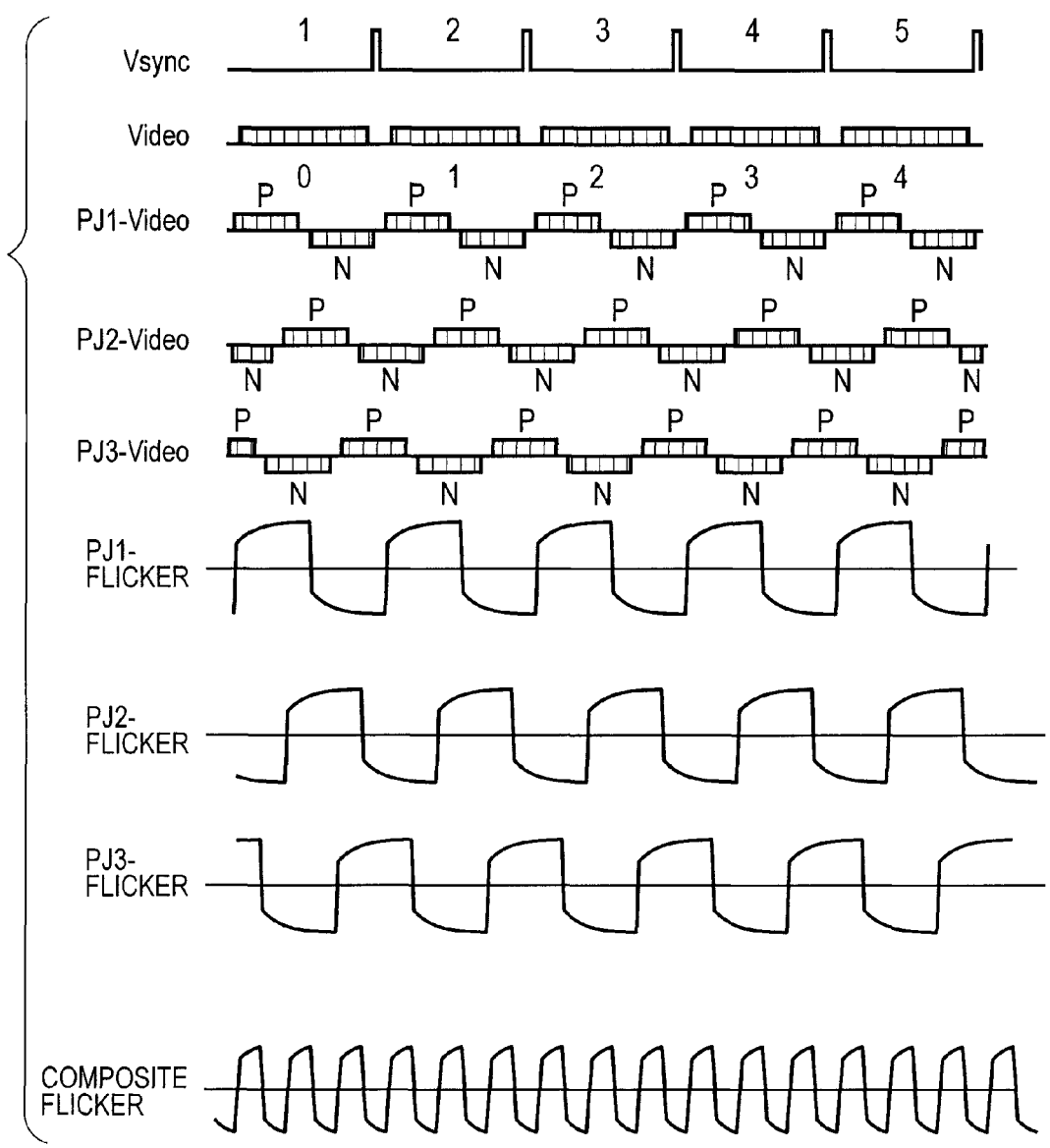
FIG. 13 is a timing chart of liquid crystal drive phase control due to delay control in a case of three projectors in stack projection according to the second embodiment of the present invention.

In the present embodiment, a master projector (projector 10a) confirms the number of projectors to perform a linked operation and types of the respective projectors. An inquiry for a phase of a liquid crystal drive signal is made to projectors of the same type. Subsequently, the master projector instructs projectors, whose liquid crystal drive signals have the same phase as a liquid crystal drive signal of the master projector, a delay by a delay time determined based on the number of projectors whose liquid crystal drive signals have the same phase. For example, when there are three projectors whose liquid crystal drive signals have the same phase including the master projector, the master projector instructs a delay of ⅓ frame (in other words, 120°=360°/3) to one of the other two projectors, and instructs a delay of ⅔ frame to the other projector. The projector instructed a ⅓ frame delay sets a delay time corresponding to ⅓ frame to the delay circuit 120 of the projector. The projector instructed a ⅔ frame delay sets a delay time corresponding to ⅔ frame to the delay circuit 120 of the projector. FIG. 13 is a timing chart illustrating this case. As illustrated in FIG. 13, a flicker (composite flicker) on a display image by stack projection has a decreased maximum value and a tripled frequency. The higher frequency reduces visibility. As a result, recognition of a flicker by a viewer decreases overall.

When there is a type that is not the same, the master projector inquires the respective projectors for Vcom characteristic information. When all projectors to perform the linked operation have Vcom characteristic information and also share the same characteristic (tendency), the master projector instructs the respective projectors delays by delay times determined in consideration of the number of projectors in the same manner as in the case where the types are the same. A Vcom characteristic is generally one of a characteristic such that a flicker appears brightly during positive frame driving and a characteristic such that a flicker appears brightly during negative frame driving, and identity of a Vcom characteristic is determined in accordance with whether the Vcom characteristic is one of the former or the latter of the two characteristics described above.

As described above, by detecting a type/Vcom characteristic of each projector to perform a linked operation and delaying a drive timing of a liquid crystal panel in accordance with the number of projectors, a flicker on a composite image due to stack projection can be reduced.

Third Embodiment

Figure 14:
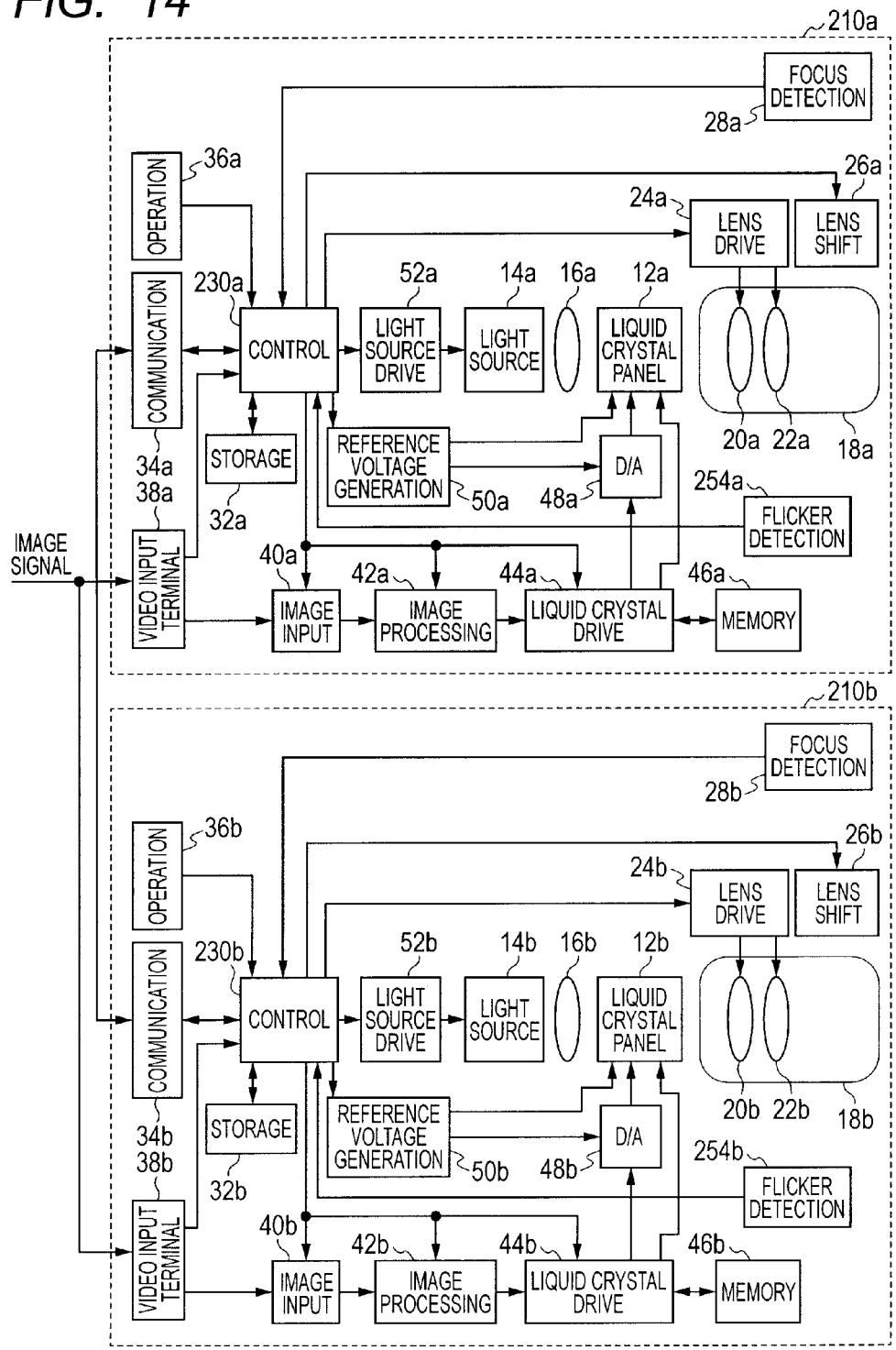
FIG. 14 is a schematic configuration block diagram of a projection system according to another exemplary embodiment of the present invention.

FIG. 14 is a schematic configuration block diagram of a third embodiment. Projectors 210a and 210b respectively include flicker detection circuits 254a and 254b. In addition to functions of the control units 30a and 30b according to the first embodiment, control units 230a and 230b include functions described below with respect to detected output of the flicker detection circuits 254a and 254b. Elements with the same functions as the components illustrated in FIG. 1 are denoted by the same reference characters.

Figures 15, 16:
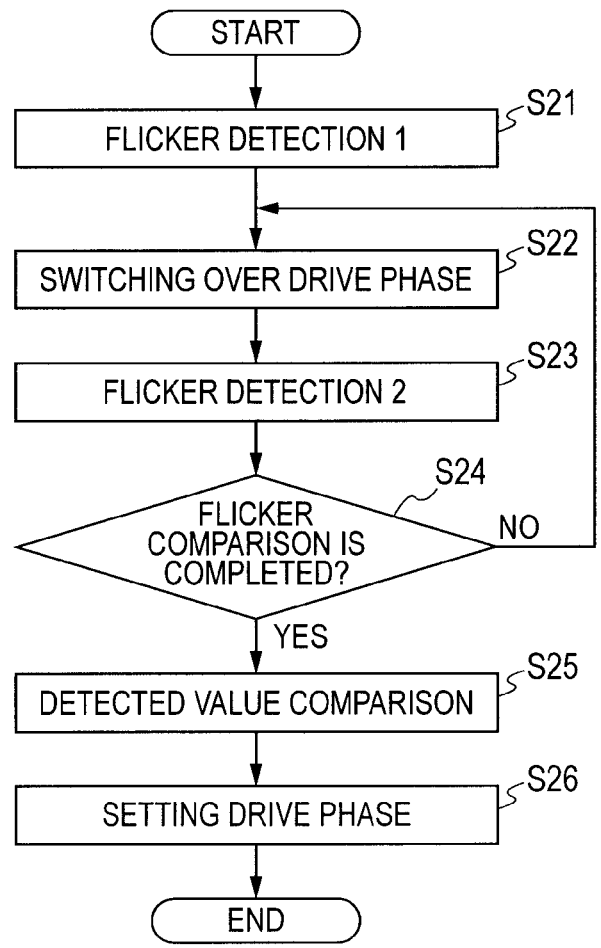
FIG. 15 is a flow chart of liquid crystal drive phase control of the embodiment according to a third embodiment of the present invention.
FIG. 16 is a diagram illustrating a combination of phases of liquid crystal drive signals in a case where three projectors perform a linked operation according to the third embodiment of the present invention.

In the present embodiment, flicker reduction is performed at the start of projection. FIG. 15 is an operation flow chart illustrating the flicker reduction. In this case, it is assumed that two projectors 210a and 210b are to perform stack projection.

A master projector (projector 210a) detects projectors to perform a linked operation and the number of those projectors through communication between projectors (S21). Subsequently, the control unit 230a of the projector 210a detects an intensity of a flicker on a composite image of projections of all projectors from an output of the flicker detection circuit 254a, and stores the detected intensity. For example, a difference voltage (a difference between a maximum value and a minimum value of a flicker) is added to an intermediate voltage of the maximum value and the minimum value of the flicker, and an addition result is set as a flicker detection value. The flicker detection is performed at least for a duration of a period including at least one negative frame and one positive frame of a liquid crystal drive signal PJ-Video.

The control unit 230a of the projector 210a inverts a phase of a positive/negative frame of a liquid crystal drive signal PJ-Video of the liquid crystal panel 12a (S22), and detects an intensity of a flicker on a composite image in the same manner (S23).

Steps S22 and S23 are repeated until flicker comparison is completed (S24). In this case, since only two projectors are performing a linked operation, two flicker detections (S21 and S23) are to suffice.

The control unit 230a compares detected values of flicker detections performed in steps S21 and S23 (S25). A drive condition of the smaller detected value is adopted for subsequent projections (S26).

When stack projection is performed by a linked operation of three projectors, a drive condition is to be determined as described below. With three projectors, as illustrated in FIG. 16, with respect to a projector 1 to be used as reference, four cases as combinations of same-phase and inverse phase are conceivable as a drive condition of the two remaining projectors. Flickers are to be detected for the four cases, whereby a drive condition resulting in a smallest flicker is to be determined and applied.

As described above, in stack projection, since a flicker is detected at the start of the projection and a drive condition resulting in a smallest flicker is determined and applied, a flicker in a composite image due to stack projection can be reduced.

Fourth Embodiment

Figure 17:
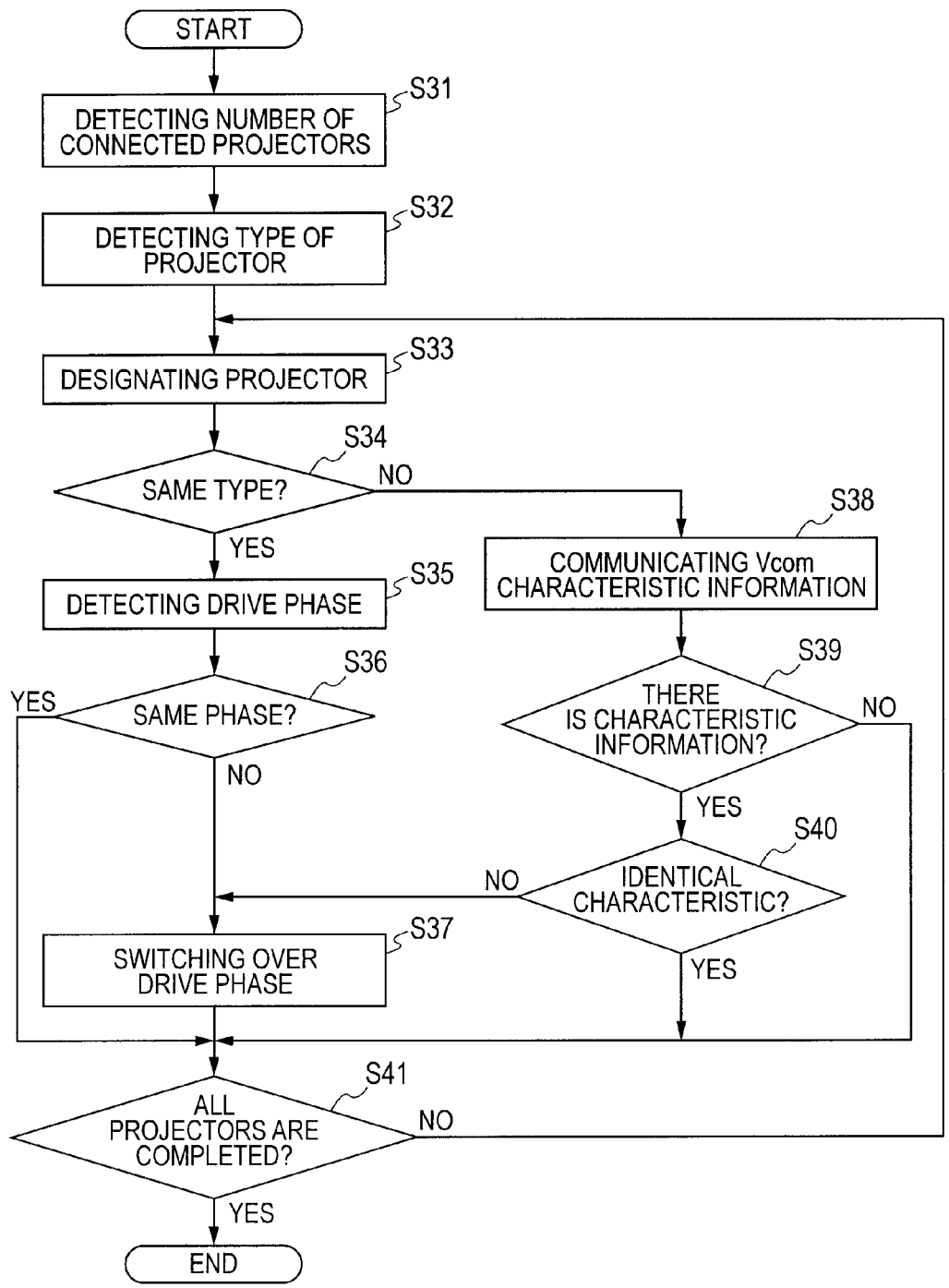
FIG. 17 is a flow chart of liquid crystal drive phase control in a case of multi projection according to a fourth embodiment of the present invention.

FIG. 17 is a flow chart illustrating a flicker control operation when multi projection is performed by the configuration illustrated in FIG. 1. In respective projectors 10a and 10b, multi projection is set to control units 30a and 30b by operating units 36a and 36b. A difference from FIG. 7 illustrating a flicker control flow for stack projection is that a case of switching over phases of liquid crystal drive signals differs.

Steps S31 to S36 are the same as steps S1 to S6 illustrated in FIG. 7, and steps S38 to S40 are the same as steps S8 to S10 illustrated in FIG. 7.

When types are the same (S34), if drive phases of PJ-Video signals of a master projector and a subject projector are not the same (S36), the master projector instructs the subject projector to switch over the drive phase (S37). With multi projection, differences in brightness between horizontally or vertically adjacent pixels are smaller and a flicker is less prominent when PJ-Video signals have the same phase.

In addition, when types are not the same (S34), if Vcom characteristic information is available (S39) and is not the same as Vcom characteristic information of the master projector (S40), the master projector instructs the subject projector to switch over the drive phase (S37). With multi projection, since differences in brightness between horizontally or vertically adjacent pixels are smaller and a flicker is less prominent when PJ-Video signals have the same phase, phases of liquid crystal drive signals are not switched over.

In the same manner as in FIG. 7, the processing described above (S33 to S40) is executed for all projectors (S41). In other words, when there is an unprocessed projector (S41), the unprocessed projector is designated (S33) and steps S34 to S40 are executed thereon.

As described above, by detecting a type/Vcom characteristic of each projector to perform a linked operation and controlling phases of liquid crystal drive signals, a flicker on a projection image due to multi projection can be reduced.

Fifth Embodiment

Figure 18:
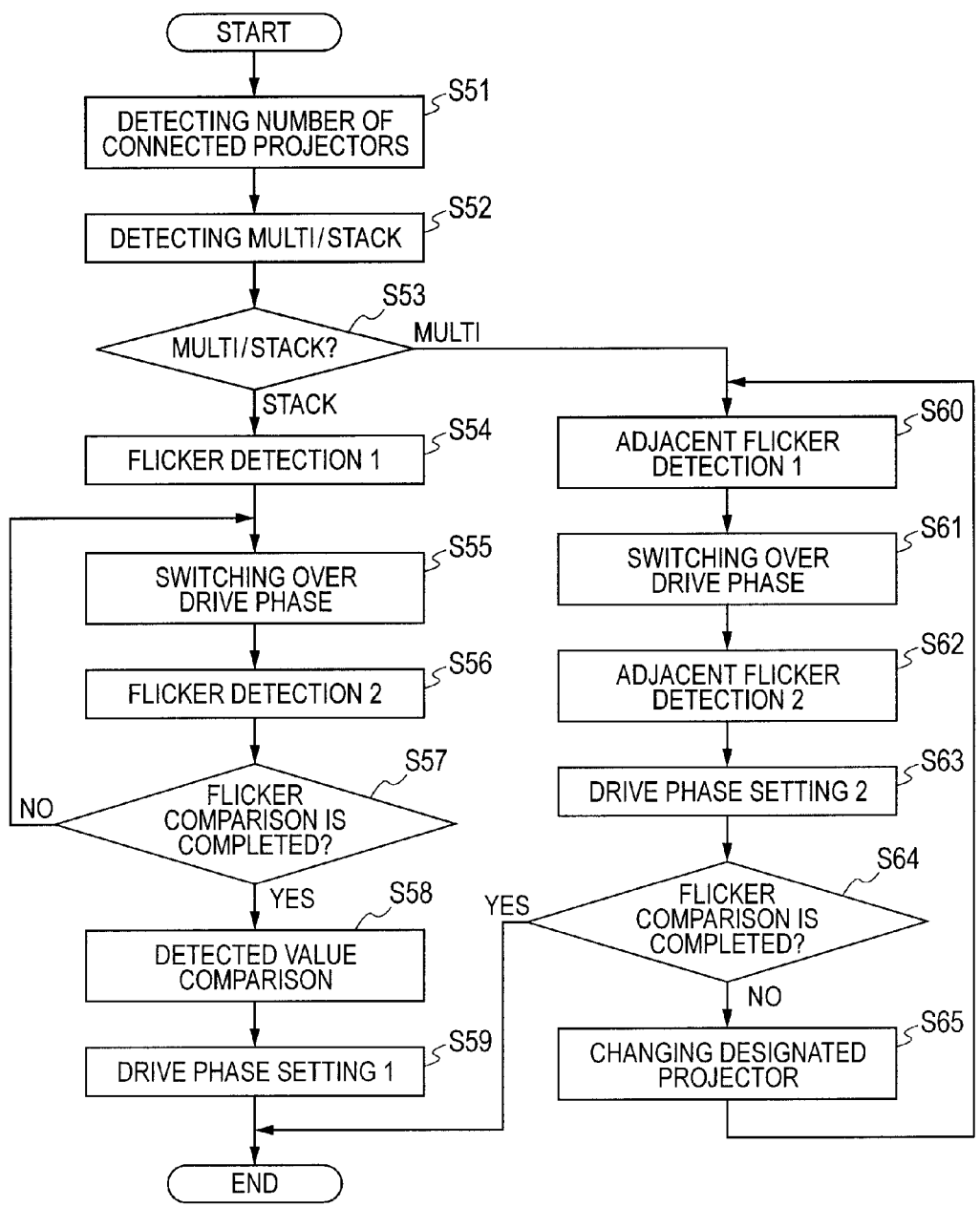
FIG. 18 is a flow chart of liquid crystal drive phase control for multi projection/stack projection according to a fifth embodiment of the present invention.

A different flicker control of the embodiment illustrated in FIG. 14 will now be described as a fifth embodiment of the present invention. FIG. 18 is a flow chart illustrating a flicker control operation according to the present embodiment. In this case, it is assumed that projectors to perform a linked operation such as projectors 210a and 210b are capable of selecting between stack projection and multi projection.

A master projector (projector 210a) detects projectors to perform a linked operation and the number of those projectors through communication between projectors (S51). The master projector (projector 210a) detects whether the linked operation as a projection system is one of stack projection and multi projection (S52).

In the case of stack projection (S53), the master projector detects a flicker for all combinations of same-phase/inverse phase of liquid crystal drive signals of the other projectors to perform the linked operation (S54 to S58). In other words, an intensity of a flicker is detected for a first combination of drive phases (S54). For example, a difference voltage (a difference between a maximum value and a minimum value of a flicker) is added to an intermediate voltage of the maximum value and the minimum value of the flicker, and the addition result is set as a flicker detection value. The drive phase is changed (S55) and a flicker intensity is detected (S56). Steps S55 and S56 are repeated until flickers are detected for all combinations (S57). The respective flicker detected values are compared (S58), and a combination of drive phases resulting in a smallest flicker is set (S59).

In the case of multi projection (S53), the master projector individually detects a flicker of a projected portion of each of other projectors and determines a drive phase so as to be optimum with respect to a projected portion of the master projector. In other words, the master projector detects a flicker of a projection image portion of another arbitrarily determined projector (S60). The drive phase of the other projector is inverted (S61) and a flicker is detected (S62). Both detection results are compared and a more favorable drive phase is set to the other projector. Flicker detection in this case is performed at least for a duration of a period including at least one negative frame and one positive frame of a liquid crystal drive signal PJ-Video.

The processing described above (S60 to S63) is executed for all remaining projectors (S64) while switching over control subject projectors (S65).

As described above, depending on whether one of stack projection and multi projection is performed, since a flicker is detected at the start of the projection and a drive condition resulting in a smallest flicker is determined and applied, a flicker in a composite image due to stack projection/multi projection can be reduced.

While a configuration block diagram of a projection system including two projectors has been exemplified, it is needless to say that a similar configuration may be realized with three or more projectors.

In the embodiment described above, a control unit of a projector to become a master projector controls liquid crystal drive timings of projectors other than the master projector on the basis of the liquid crystal drive timing of the master projector. However, it is obvious that a configuration may be adopted in which such a drive timing control unit is provided outside of the master projector to control liquid crystal drive timings of all projectors to perform a linked operation.

The present invention is also applicable to a projector having a plurality of projection systems.

In addition, it is needless to say that the object of the present invention can also be achieved by supplying a storage medium storing a program code of software that realizes the functions of the embodiment described above to a system or an apparatus and having a computer (a CPU or an MPU) of the system or the apparatus read out and execute the program code stored in the storage medium.

In this case, the program code itself read from the storage medium realizes the function of the embodiments described above and the program code itself and the storage medium storing the program code are to constitute the present invention.

Examples of the storage medium for supplying the program code may include a flexible disk, a hard disk, an optical disk, a magnetic optical disk, a CD-ROM, a CD-R, a magnetic tape, a non-volatile memory card, and a ROM.

Furthermore, in addition to a case where functions of the respective embodiments described above are realized by having a computer read and execute a program code, the present invention also includes cases where the functions of the embodiments described above are realized by an OS (operating system) or the like running on a computer and which performs a part or all of the actual processing based on instructions of the program code.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-283561, filed Dec. 15, 2009, which is hereby incorporated by reference herein in its entirety.

What is claimed is:

1. A projection system comprising:
a first projector and a second projector,
wherein the first projector includes:
a first driver that drives a first liquid crystal panel for displaying a first image to be projected in a frame inversion manner in which a positive drive for displaying an image by driving a liquid crystal panel with a positive voltage and a negative drive for displaying an image by driving a liquid crystal panel with a negative voltage are switched every frame of images;
a first controller that controls the first driver; and
a communication unit that communicates with the second projector, and
wherein the second projector includes:
a second driver that drives a second liquid crystal panel for displaying a second image to be projected in the frame inversion manner; and
a second controller that controls the second driver,
wherein the communication unit receives, from the second projector, information for discriminating a timing of the positive drive and a timing of the negative drive by the second driver,
wherein the first controller outputs to the second projector, in accordance with the information received by the communication unit and a timing of the positive drive by the first driver, a predetermined signal for controlling the second driver to drive the second liquid crystal panel with the negative drive when the first driver drives the first liquid crystal panel with the positive drive, and
wherein the second controller controls the timing of the positive drive and the timing of the negative drive by the second driver in accordance with the predetermined signal output from the first controller.

2. The projection system according to claim 1, wherein the first projector and the second projector project the first and the second images in a superposing manner on a screen.

3. The projection system according to claim 1, wherein the first controller controls the second driver to drive the second liquid crystal panel with the positive drive when the first driver drives the first liquid crystal panel with the negative drive.

4. The projection system according to claim 1, wherein the first controller outputs to the second projector a second predetermined signal for controlling the second driver to drive the second liquid crystal panel with the positive drive when the first driver drives the first liquid crystal panel with the positive drive, in a predetermined mode in which the first and the second images are projected at positions that differ from each other on a screen.

5. A projector that projects an image on a screen, comprising:
a driver that drives a first liquid crystal panel for displaying an image to be projected, in a frame inversion manner in which a positive drive for displaying an image by driving a liquid crystal panel with a positive voltage and a negative drive for displaying an image by driving a liquid crystal panel with a negative voltage are switched every frame of images;
a controller that controls the driver; and
a communication unit that communicates with another projector having a second liquid crystal panel driven in the frame inversion manner,
wherein the communication unit receives, from said another projector, information for discriminating a timing of the positive drive and a timing of the negative drive in said another projector, and
wherein the controller outputs to said another projector, in accordance with the information received by the communication unit and a timing of the negative drive by the driver, a predetermined signal for controlling said another projector to drive the second liquid crystal panel of said another projector with the positive drive when the driver drives the first liquid crystal panel with the negative drive.

6. The projector according to claim 5, wherein said another projector is controlled, in accordance with the predetermined signal, to drive the second liquid crystal panel with the positive drive when the driver drives the first liquid crystal panel with the negative drive.

7. A control method of a projector comprising a driver that drives a first liquid crystal panel that displays an image to be projected in a frame inversion manner in which a positive drive for displaying an image by driving a liquid crystal panel with a positive voltage and a negative drive for displaying an image by driving a liquid crystal panel with a negative voltage are switched every frame of images, and a communication unit that communicates with another projector having a second liquid crystal panel driven in the frame inversion manner, the control method comprising the steps of:
receiving, from said another projector, information for discriminating a timing of the positive drive and a timing of the negative drive in said another projector; and
outputting to said another projector, in accordance with the information received by the communication unit and a timing of the positive drive by the driver, a predetermined signal for controlling said another projector to drive the second liquid crystal panel of said another projector with the negative drive when the driver drives the first liquid crystal panel with the positive drive.

8. A non-transitory computer-readable recording medium storing a computer program comprising a program code for causing a computer to execute the control method according to claim 7.

9. The projector according to claim 5, wherein the controller determines whether the timing of the positive drive in said another projector is the same as the positive drive by the driver in accordance with the information received by the communication unit and a timing of the positive drive by the driver, and outputs to said another projector the predetermined signal if it is determined that the timing of the positive drive in said another projector is the same as the positive drive by the driver.

* * * * *